United States Patent [19]
Lepard et al.

[11] Patent Number: 6,102,181
[45] Date of Patent: Aug. 15, 2000

[54] CLUTCH WITH ROLLER FORK

[75] Inventors: Steve Duane Lepard, Angola; Daniel V. Gochenour, Auburn; Christopher D. Cole, Fort Wayne, all of Ind.

[73] Assignee: Eaton Corporation, Cleveland, Ohio

[21] Appl. No.: 09/188,424

[22] Filed: Nov. 9, 1998

Related U.S. Application Data

[63] Continuation-in-part of application No. 08/886,375, Jul. 1, 1997, Pat. No. 5,911,296.

[51] Int. Cl.$^7$ .............................. F16D 13/50; F16D 23/14
[52] U.S. Cl. .................................... 192/70.29; 192/89.26; 192/99 S; 192/98
[58] Field of Search ............................ 192/70.27, 70.29, 192/70.3, 89.26, 99 A, 99 S, 98, 101, 110 B; 384/449, 903

[56] References Cited

U.S. PATENT DOCUMENTS

| | | | |
|---|---|---|---|
| 1,446,657 | 2/1923 | Parsons | 192/99 S |
| 1,611,557 | 12/1926 | Reed | 192/98 |
| 1,966,100 | 7/1934 | McAdams et al. | 192/110 B X |
| 2,163,897 | 6/1939 | Taylor | 192/99 S X |
| 2,354,621 | 7/1944 | Spase | 192/98 |
| 2,876,882 | 3/1959 | Kelleigh | 192/82 R X |
| 2,973,849 | 3/1961 | Sabatt . | |
| 3,394,788 | 7/1968 | Sink | 192/89.26 |
| 4,720,002 | 1/1988 | Kitano et al. | 192/70.29 X |
| 4,997,075 | 3/1991 | Nakamura et al. | 192/98 |
| 5,238,310 | 8/1993 | Layfield | 384/903 X |
| 5,911,296 | 6/1999 | Cole et al. | 192/70.29 |

FOREIGN PATENT DOCUMENTS

| | | | |
|---|---|---|---|
| 1194714 | 11/1985 | U.S.S.R. | 192/99 S |

OTHER PUBLICATIONS

Figures T7X5766 and T4X5767 from TSI (Clutch, Pull–Type Volvo, Manual No. 411–600) 1989.

*Primary Examiner*—Richard M. Lorence
*Attorney, Agent, or Firm*—Dykema Gossett PLLC

[57] ABSTRACT

A clutch release mechanism includes a clutch release sleeve, a clutch release bearing and a clutch release fork. The clutch release sleeve has a lever engagement feature at a first end. The clutch release bearing engages a second end of the clutch release sleeve and has an inner race rotatably fixed to the second end of the clutch release sleeve. The clutch release fork has rollers disposed on each of two arms for engagement with an outer race of the clutch release bearing. The rollers each including a dowel pin with a first end received by a respective fork arm, the dowel pin having a second end encircled by a rotatively mounted tire. The tire has a through bore and a bushing fixedly mounted therein. A retainer is provided for preventing axial displacement of the tire from the second end of the dowel pin.

21 Claims, 4 Drawing Sheets

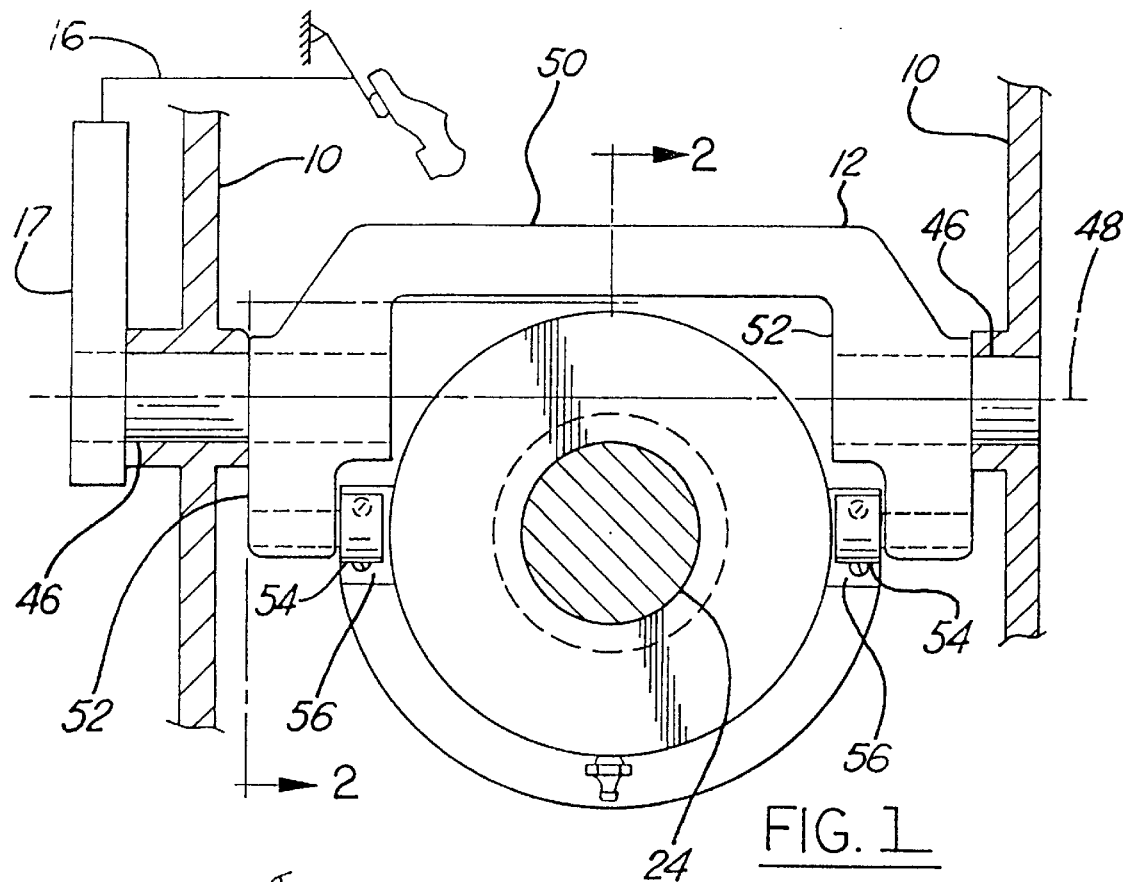
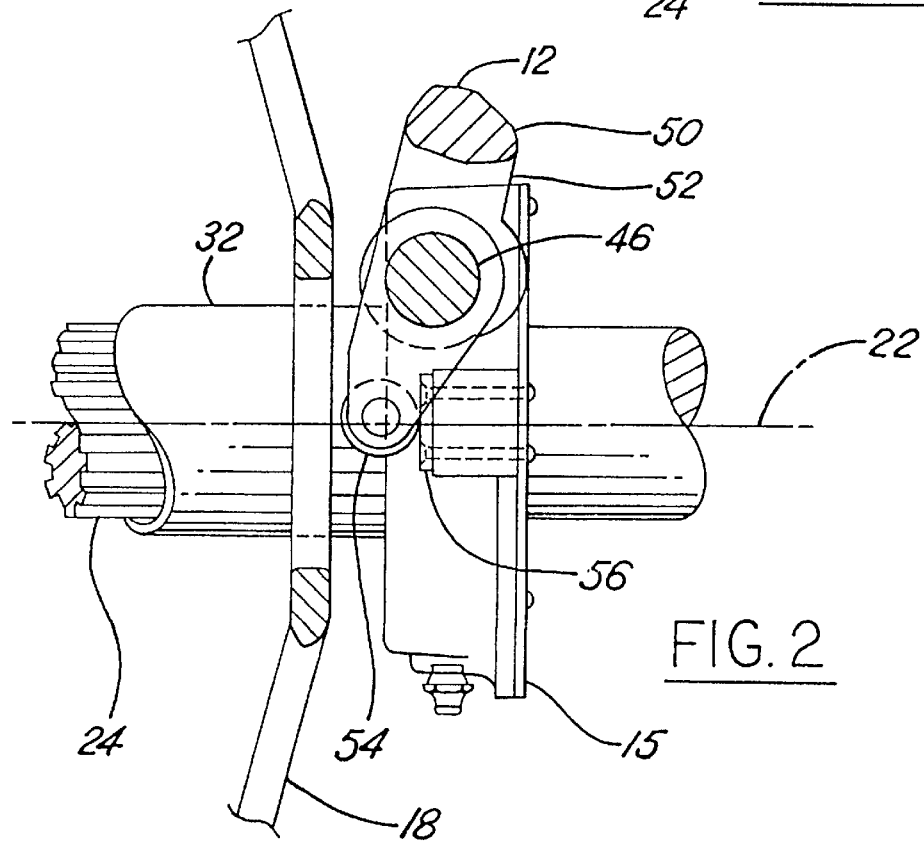
FIG. 1
FIG. 2

CLUTCH WITH ROLLER FORK

This application is a continuation-in-part under 37 CFR §1.53(b) of U.S. patent application Ser. No. 08/886,375 filed on Jul. 1, 1997 now U.S. Pat. No. 5,911,296 and entitled "Clutch With Roller Fork".

FIELD OF THE INVENTION

This invention relates to motor vehicle clutches, and in particular, clutches employing a release sleeve disposed between a release bearing and sleeve end engaging a clutch spring and/or clutch levers, and the means for displacing release bearings associated with such clutches.

BACKGROUND OF THE INVENTION

Clutches designed for use in heavy and medium duty applications commonly employ sleeves which ride on a transmission input shaft. The sleeve connects a release bearing with a clutch spring and/or clutch levers which provide the clutch engagement load against the pressure plate. The sleeve is disposed over the transmission input shaft and rotates with the spring, as well as the cover, flywheel and pressure plate of the clutch. A bushing in axial alignment with the bearing is press fit in the sleeve for unitary rotation therewith and rides directly on the transmission input shaft. Relative rotation between the sleeve and the transmission input shaft occurs when the clutch is partially or fully released. An inner race of the release bearing is connected to the sleeve for movement therewith. An outer race is connected to a bearing housing which is prevented from rotating, and is in engagement with a clutch fork. Wear pads on the bearing housing are engaged by the ends of the fork's arms. The clutch fork is pivotably mounted in a clutch housing connecting an engine block and a transmission case. The clutch fork is connected with an operator controlled pedal for selective axial displacement of the bearing and sleeve and the consequent disengagement of the clutch.

The pivotal motion of the clutch fork, in combination with the frictional force between the fork arms and the wear pads, induces an "uplift" force on the bearing which is transferred through the bearing to the sleeve and to the bushing therein. The uplift force is approximately equal to the coefficient of friction between the fork arms and the pads multiplied by the normal force applied by the arms against the pads. The uplift force presses the sleeve bushing against the input shaft during clutch disengagements, thereby accelerating wear of the sleeve bushing.

Original equipment manufacturers of vehicles (OEMs) are now requiring that clutches be substantially maintenance free for extended mileage periods. To increase the life of sleeve bushings, it is highly desired to reduce the friction between the fork and the release bearing and thereby reduce the uplift force.

Clutch forks are known which employ rollers to engage the release bearings of those clutches. However, those forks are used in combination with clutch bearings which ride not on the transmission input shaft, but on a stationary quill extending from the transmission case and circumscribing but not touching the input shaft. Additionally, known roller forks are not appropriately configured to enable them to be substituted into existing clutch systems having very limited space within the clutch housing.

It is desired to provide a low friction clutch fork to release bearing interface which will reduce sleeve bushing wear. It is further desired to provide such a clutch fork and release bearing combination which fits in the space available for a conventional fork and release bearing combination.

SUMMARY OF THE INVENTION

A clutch release mechanism includes a clutch release sleeve, a clutch release bearing and a clutch release fork. The clutch release sleeve has a lever engagement feature at a first end. The clutch release bearing engages a second end of the clutch release sleeve and has an inner race rotatably fixed to the second end of the clutch release sleeve. The clutch release fork has rollers disposed on each of two arms for engagement with an outer race of the clutch release bearing.

A clutch includes a flywheel, a transmission input shaft, a clutch cover, a pressure plate, a clutch driven disc, a clutch release sleeve, a plurality of radially oriented levers, a spring, a release bearing, a clutch housing, a clutch release shaft, a clutch release fork, and rollers. The flywheel is rotatably disposed on an axis of rotation. The transmission input shaft is disposed on the axis of rotation and has a splined portion. The clutch cover is fixed to the flywheel. The pressure plate is disposed between the clutch cover and the flywheel for axial movement therebetween, and is rotatably fixed to the cover. The clutch driven disc is rotatably fixed to the input shaft through the splines and is disposed between the flywheel and the pressure plate for axial slidable movement therebetween. The clutch release sleeve is slidably disposed over the input shaft and has a first end disposed between the pressure plate and the cover, and a second end disposed on a side of the cover opposite the pressure plate. The plurality of radially oriented levers are distributed about the axis of rotation. The levers have radially inwardly disposed ends engaging a first end of the release sleeve. The levers extend between the release sleeve and the pressure plate or spring. The spring is disposed between the pressure plate and the cover and biases the pressure plate toward the driven disc. The clutch release bearing is disposed at the second end of the release sleeve, outside the clutch cover. The clutch housing is disposed over the clutch cover and the release bearing. The clutch release shaft is rotatably disposed in the clutch housing and is pivotable about a pivot axis oriented at 90° to the axis of rotation. The clutch release fork is fixed to the clutch release shaft for rotation therewith and has first and second arms extending adjacent to the release bearing. The rollers are rotatably disposed on each of the first and second arms of the clutch release fork, and are in engagement with the release bearing. The rollers each include a dowel pin with a first end received by a respective fork arm. The dowel pin has a second end encircled by a rotatively mounted tire. The tire has a through bore with a bushing fixedly mounted therein. A retainer is provided for preventing axial displacement of the tire from the second end of the dowel pin.

The inventive clutch and clutch release mechanism which employ a fork with rollers are highly effective at reducing friction between the fork and the release bearing and advantageously reducing the wear of the sleeve bushing. The disclosed fork and bearing combination are advantageously configured to fit within a clutch housing having a very limited amount of space.

BRIEF DESCRIPTION OF THE DRAWINGS

FIG. 1 is a rearward facing end view of a clutch release bearing and clutch fork.

FIG. 2 is a side view of the release bearing and fork of FIG. 1 shown in the direction of arrows 2.

DETAILED DESCRIPTION OF PREFERRED EMBODIMENTS

Figure 3:
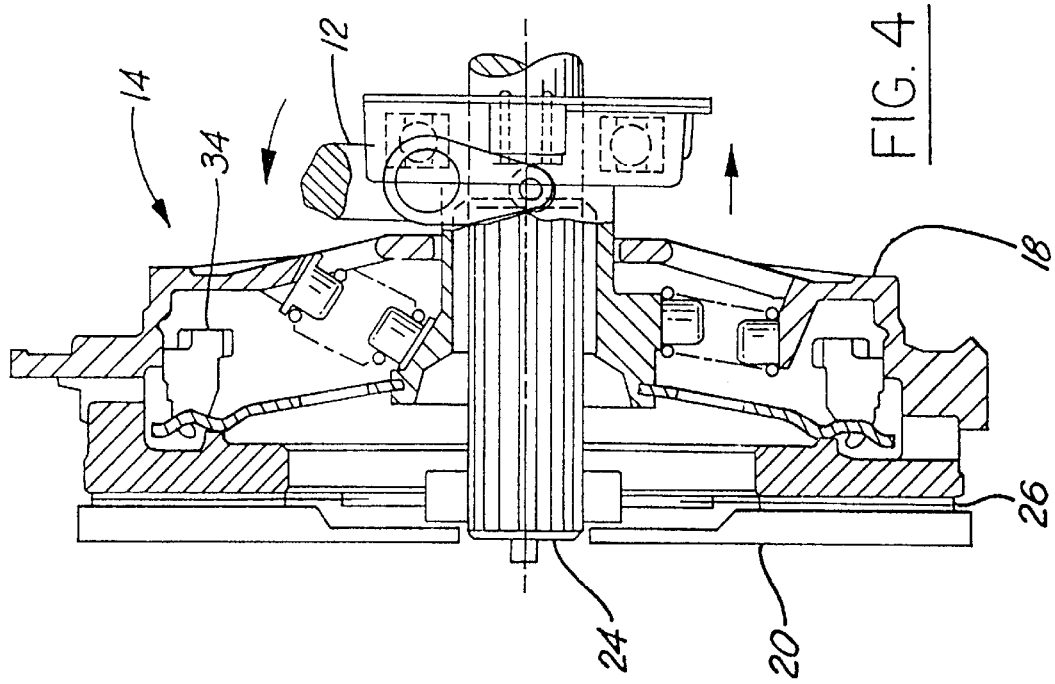
FIG. 3 is a sectional side view of a clutch assembly employing the release bearing and fork of FIG. 2 and shown in a disengaged position.

FIG. 1 shows a clutch housing 10 pivotably supporting a clutch fork 12. Clutch fork 12 is used to selectively disengage clutch assembly 14, best shown in FIGS. 3 and 4, though displacement of clutch release bearing 15. A clutch linkage 16 disposed between a vehicle operator and the clutch fork 12 includes an operating lever 17 disposed outside of clutch housing 10.

Clutch assembly 14 includes a clutch cover 18 fixed to a flywheel 20. Flywheel 20 is in turn fixed to an engine crankshaft (not shown) for rotation about an axis of rotation 22. A transmission input shaft 24, splined on a first end, extends from a transmission case (not shown) along axis 22. A driven disc 26 is slidably disposed on the splined portion of input shaft 24 for rotation therewith. A pressure plate 28 compresses driven disc 26 between itself and flywheel 20. Six clutch apply levers 30 are circumferentially distributed about axis 22, and extend radially from a first end of a release sleeve 32. A radially outer end of each lever 30 engages cover 18 directly, or indirectly through an adjusting mechanism.

An inner race 36 of release bearing 15 is engaged with release sleeve 32 for axial movement therewith. A snap ring helps retain inner race 36 on sleeve 32. An input shaft bushing 37 is press-fit in sleeve 32 in axial alignment with bearing 15. An outer race 38, rotatably fixed to a bearing housing 39, is prevented from rotating relative to clutch housing 10.

Angle springs 40, which develop the clutch apply loads, are disposed between clutch cover 18 and the first end of sleeve 32. Both the sleeve 32 and cover 18 have corresponding spring engaging features 42 and 44 respectively.

Clutch fork 12 straddles bearing 15 and is fixed to two coaxial fork shafts 46 for pivoting about pivot axis 48. Operating lever 17 is fixed to one of fork shafts 46. A cross member 50 of fork 12 connects two opposed arms 52 adjacent bearing 15. Each of arms 52 have rollers 54 disposed on pins 58 extending inboard from near the ends of arms 52. Rollers 54 engage wear pads 56 on a forward side of bearing 15.

Figure 6:
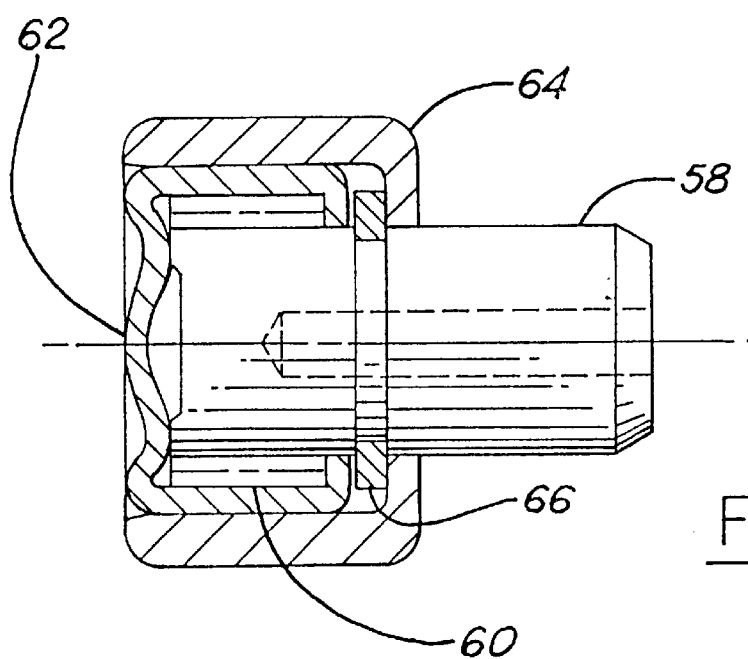
FIG. 6 is a sectional view of a roller used with the fork of FIGS. 1–4.

A roller 54 is shown in more detail in FIG. 6. A dowel pin 58 has a first end received by one of the arms 52. A second end of pin 58 supports needle roller 60 retained by a cup 62. An outer housing 64 encloses cup 62 and serves as a roller surface. A retaining ring 66 disposed in a groove in pin 58 helps retain housing 64 and cup 62. All of the elements of the illustrated roller 54 are formed of steel. Alternate roller designs include the use of ball bearing elements in place of needle rollers, or a Teflon coated bushing riding directly on the dowel pin.

Figure 8:
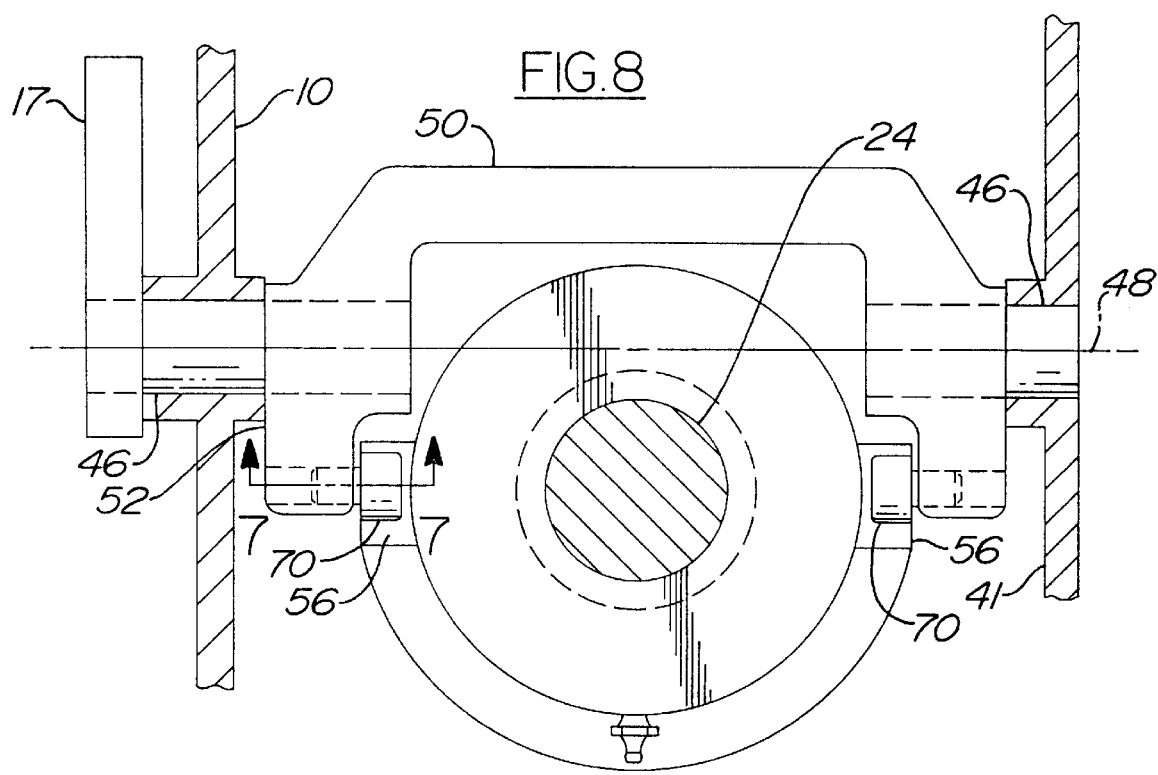
FIG. 8 is a rearward facing end view of a clutch release bearing and clutch fork.
Figure 7:
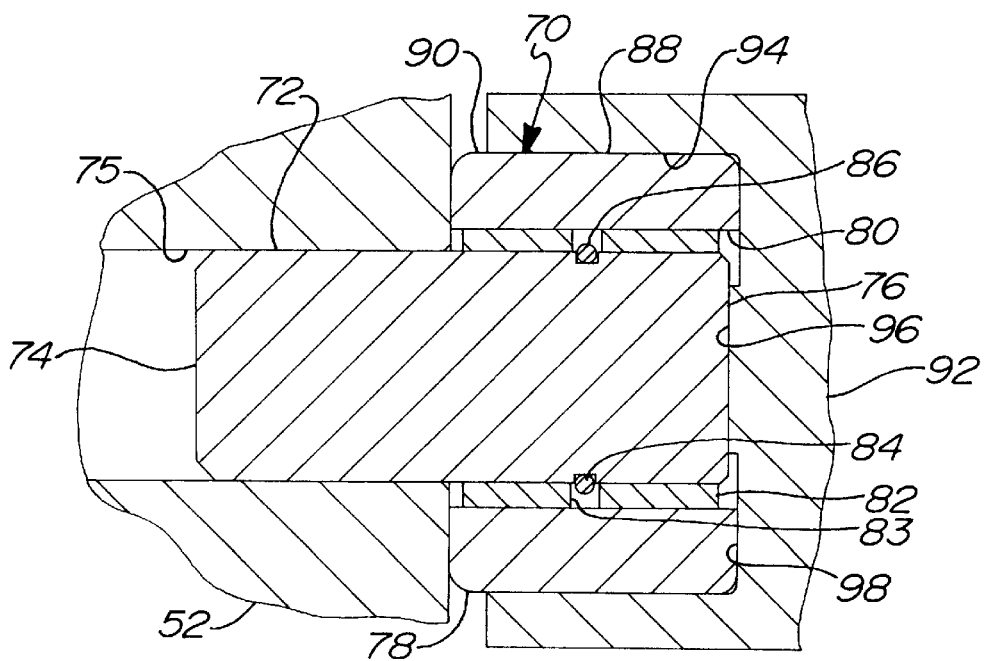
FIG. 7 is a sectional view of a roller used with the fork of FIGS. 8 in the direction of arrows 7 in FIG. 8

Referring to FIGS. 7 and 8, an alternative roller configuration is shown. A roller 70 has a dowel pin 72. Dowel pin 72 has a first end 74 which is received by and fixed within a through bore 75 on the inboard side of respective fork arm 52. Pin 72 and bore 75 are sized to provide a press fit therebetween. Dowel pin 72 also has a second end 76. Second end 76 is encircled by a rotatively mounted tire 78. Tire 78 provides a roller surface contacting wear pads 56. Tire 78 has a through bore 80. Fixedly mounted in through bore 80 are two bushings 82. Bushings 82 in the embodiment illustrated are pressed within through bore 80 of tire 78 and are sized to provide an interference fit. Bushings 82 define an annular groove 83 therebetween.

Dowel pin 72 also has an annular groove 84 aligned with groove 83. Dowel pin 72 is formed, in one embodiment, by selecting an unhardened needle roller of the diameter of pin desired. Groove 84 is cut in pin 72. Pin 72 is then hardened and polished. Disposed within annular grooves 83 and 84 is a retaining ring 86. Retaining ring 86 is split to enable it to radially elastically expand to fit over pin 72 and contract to snap into groove 84. Via bushings 82, retaining ring 86 restrains axial displacement of the tire 78 upon the dowel pin 72. A contact surface 88 of tire 78 is slightly crowned, having an apex at its midpoint 90. Crowning of tire 78 allows the tire to compensate for deflections and misalignment without excessive edge loading of the tire 78 and bushings 82. In one embodiment, a crown having a radius of 3000 mm is placed on a tire approximately 12 mm in width and having a diameter of approximately 19 mm.

The retaining ring 86 shown is carried by tire 78 in groove 84, between bushings 82, prior to assembly to pin 72. In a free or undistorted condition, ring 86 has an inside diameter smaller than an outside diameter of pin 72 and has an outside diameter larger than an inside diameter of bushings 82. The groove between bushings 82 has a radial depth at least equaling a wire diameter of ring 86. The depth of groove 83 enables ring 86 to be disposed entirely within groove 83. Tire 78 is assembled to pin 72 by aligning tire 78 and pin 72, and then pressing against tire 78. A leading chamfer on pin 72, expands ring 86 so that ring 86 is completely disposed within groove 83. When grooves 83 and 84 are aligned, ring 86 snaps into groove 84 to retain tire 78 on pin 72.

Alternatively, retaining ring 84 could be carried by pin 72 before tire 78 is assembled to dowel pin 72. However, groove 84 would have to be sufficiently deep to accommodate the full cross sectional wire diameter or sectional thickness of ring 86. Ring 86 would have an inside diameter smaller than an outside diameter of pin 72 and an outside diameter larger than an inside diameter of bushings 82. Groove 83 would be shallower than groove 84, limiting the outward radial expansion of ring 86. When tire 78 is pushed over pin 72, ring 86 would collapse into groove 84, and expand into groove 83 when grooves 83 and 84 are aligned to retain tire 78 on pin 72.

Tire 78 can yet alternatively be assembled to pin 72 in the following manner. Retaining ring 86 is expanded to slip over pin 72 and into alignment with groove 84. Ring 86 is allowed to snap into groove 84 and is retained therein. Groove 84 has a depth approximately equal to one half the wire diameter or thickness of ring 86. A first bushing 82 is pressed into tire 78. First bushing 82 is pressed to a predetermined depth within tire 78 such that its outermost edge is disposed slightly below a first side of tire 78. The assembled tire 78 and first bushing 82 are slipped over the second end 76 of pin 72 on a first side of retaining ring 86. The innermost edge of first bushing 82 is proximate to the middle of bore 80. The second bushing is slipped over the first end 74 of pin 72 on a second side of retaining ring 86. Tire 78 is axially restrained and the second bushing 82 is pressed into bore 80 to a predetermined depth such that the innermost edge of the second bushing 82 is a predetermined distance from the innermost edge of the first bushing 82 and the outermost edge of the second bushing 82 is disposed below the second side of tire 78.

Locating the first bushing at a predetermined axial location within the tire, such as having the innermost edge of the first bushing a predetermined distance from the second side of tire 78, advantageously prevents a thrust load which bias tire 78 outward toward arms 52 from developing between ring 86 and the first bushing 82. Bushings 82 are not designed to sustain thrust loads and may be damaged if they sustain significant thrust loads. The predetermined location of bushing 82 within tire 78 is selected to ensure contact between the second side of tire 78 and the corresponding arm 52 of fork 12 when tire 78 is pressed toward arm 52. The assembled roller 70 has the second end 76 of pin 72 axially offset from or slightly recessed below the outer or first side of tire 78.

The above-described positioning relationship between tire 78 and retainer ring 86 and fork arm 52 requires that pin 72 be inserted to a predetermined depth within bore 75. This is accomplished using a special press tool 92, best shown in FIG. 7, on the ram (not shown) which pressed rollers 70 into arms 52.

Tool 92 is cup-shaped on its end. Tool 92 has a blind bore 94 of an inner diameter sized to radially clear tire 78. Bore 94 has a depth less than an axial length of tire 78. A boss 96 at a bottom 98 of bore 94 extends upward from bottom 98 by an amount just slightly greater than the axial offset between second 76 of pin 72 and the side of tire 78. The diameter of boss 96 is less than an outside diameter of pin 72.

To install roller 70 on arm 52, tool 92 is slipped over tire 78 as shown in FIG. 7. Boss 96 engages second end 76. Tool 92 is forced toward fork, arm 52, pressing 72 pin 72 into bore 95. Tire 78 engages fork arm 52. After the seating of tire 78 against fork arm 52, continued ram force produces a slight amount of travel of tool 92 and pin 72 relative to wheel 78. This small amount of travel is the result of the slight amount of axial offset of the tool in excess of the pin to tire offset of roller 70. The slight amount of excess offset helps insure that tool 92 acts against pin 72, and not against tire 78 when forcing pin 72 into bore 75.

An advantage of roller 70 is that it requires no initial or maintenance lubrication. Bushings 82 have a large contact area with the dowel pin 72 compared with needle rollers 60, thereby eliminating any brinelling of pin 72. Roller 70 is very robust in vibratory, low angular displacement environments due to its resistance to brinelling. It is apparent to those skilled in the art that retaining ring 86 may be of various cross-sections and may be a wire ring or a snap ring. Retention of tire 78 can also be achieved by having a flange collar integral to dowel pin 72 and juxtaposed bushings 82. Retention of tire 78 to dowel pin 72 can also be achieved by having an end head on dowel pin 72, enabling the use of a single bushing.

Rollers 54, 70 and release bearing 15 are designed as matched sets so that the axial position of sleeve 32 varies as a function of the rotative position of lever 17 exactly as the position of sleeve 32 would vary with the position of lever 17 in a non-roller system. This allows the roller fork 12 to be installed in a system not explicitly designed for compatibility with a roller fork. The arms 52 of fork 12 have been widened to make them more resistant to the torsional twisting force introduced by the cantilevered rollers 54, 70.

Figure 4:
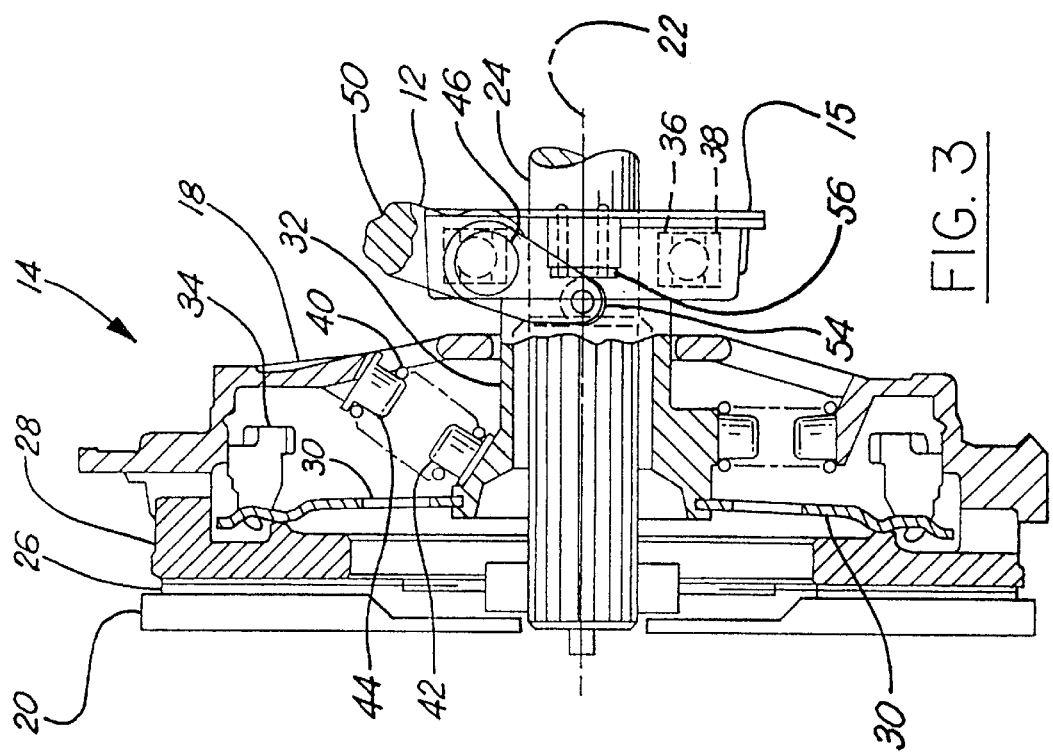
FIG. 4 is a sectional side view of the clutch assembly of FIG. 3 in a released position.
Figure 5:
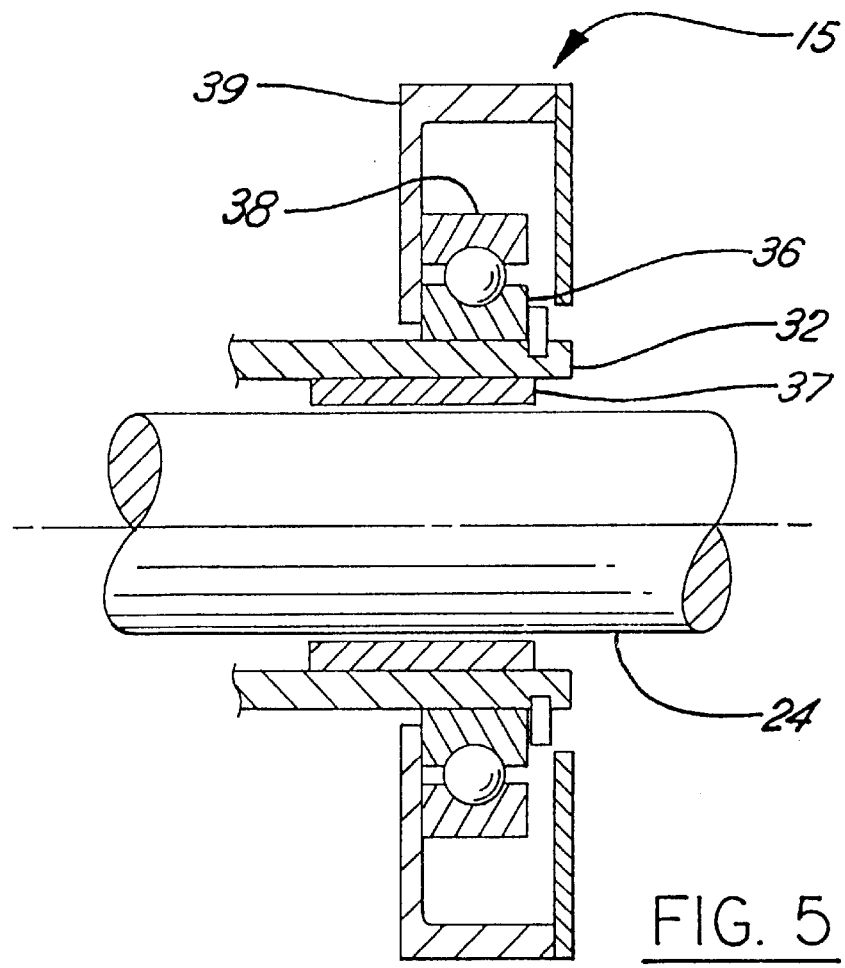
FIG. 5 is a sectional side view of the release bearing of FIG. 1.

The invention operates in the following manner. FIG. 3 shows the clutch 14 in an engaged condition. The position of clutch fork 12 and lever 17 is controlled by the position of release bearing 15, which is in turn controlled by the travel limits of levers 30 against pressure plate 28, responsive to the force of springs 40. When the clutch is released by the operator through linkage 16, operating lever 17 rotates clutch fork 12 to the position shown in FIG. 4, axially displacing release bearing 15 rearwardly against the force of springs 40 to unload pressure plate 28. The unloading of pressure plate 28 unclamps driven disc 26, enabling relative rotation between driven disc 26 and pressure plate and flywheel 28 and 20.

As fork 12 is pivoted to the disengaged position, rollers 54, 70 move in a first direction along wear pads 56. As the clutch is reengaged by the operator, rollers 54, 70 move in a second direction, opposite the first direction, along wear pads 56. Rollers 54, 70 prevent the undesired wear of sleeve 37 by eliminating substantially all of the frictional drag of fork 12 against pads 56.

It should be appreciated that many alternative embodiments are readily apparent to those skilled in the art of clutches. For example, a diaphragm spring may be used in place of angle springs 40. Yet alternatively, a diaphragm spring may be used in place of both diaphragm spring 40 and levers 30. In such an embodiment, radially inward extending fingers of the diaphragm spring would serve as the levers. Displacement of the radially inwardly disposed ends of the levers causes the pressure plate to be selectively unloaded by deflecting an annular radially outer portion of the spring. The annular radially outer portion of the spring is disposed directly between the pressure plate 28 and the cover 18, instead of indirectly as shown in the preferred embodiment, with spring 40 having one end acting on cover 18 and a second end acting on sleeve 32 which acts on lever 30 which acts on pressure plate 28. However, in both embodiments, displacement of the sleeve results in deflection of the spring or springs.

In light of these and other possible variations of the invention, the scope of the invention as defined by the appended claims is not limited to the above disclosed preferred embodiment.

What is claimed is:

1. A clutch for rotatably connecting a motor vehicle engine crankshaft with a transmission input shaft, the clutch comprising:

a flywheel rotatably disposed on an axis of rotation;

a transmission input shaft disposed on the axis of rotation and having a splined portion;

a clutch cover fixed to the flywheel;

a pressure plate disposed between the clutch cover and the flywheel for axial movement therebetween and rotatably fixed to the cover;

a clutch driven disc rotatably fixed to the input shaft through the splined portion and disposed between the flywheel and the pressure plate for axially slidable movement therebetween;

a clutch release sleeve slidably disposed over the input shaft having a first end disposed between the pressure plate and the cover and having a second end disposed on a side of the cover opposite the pressure plate;

a plurality of radially oriented levers distributed about the axis of rotation and having radially inwardly disposed ends engaging a first end of the release sleeve and the levers extending between the release sleeve and the pressure plate;

a spring disposed between the pressure plate and the cover biasing the pressure plate toward the driven disc;

a clutch release bearing connected to a second end of the release sleeve and disposed outside the clutch cover and the bearing also having an engagement surface;

a clutch housing disposed over the clutch cover and the release bearing;

a clutch release shaft rotatably disposed in the clutch housing and pivotable about a second axis oriented at 90° to the axis of rotation;

a clutch release fork rotatably fixed to the clutch release shaft for rotation therewith and having first and second arms extending adjacent to the release bearing; and a plurality of rollers with one roller rotatably disposed on an inboard side of each of the first and second arms of the clutch release fork and in engagement with the engagement surface of the release bearing, the rollers each including a dowel pin with a first end received by a respective fork arm, the dowel pin having a second end encircled by a rotatively mounted tire, the tire having a through bore and a bushing fixedly mounted therein, and a retainer disposed between the pin and the tire for preventing axial displacement of the tire from the second end of the dowel pin.

2. A clutch as claimed in claim 1, wherein the bushing has an interference fit with the tire.

3. A clutch as claimed in claim 2, wherein the bushing is press fit within the tire.

4. A clutch as described in claim 1, wherein the dowel pin has a first annular groove and the bushing has a second annular groove with the first annular groove and the retainer ring disposed in both grooves to axially retain the tire on the dowel pin.

5. A clutch as claimed in claim 1, wherein there are two bushings fixed within the tire defining a first annular groove and the dowel pin has a second annular groove aligned with the first annular groove and the retainer is disposed in the aligned first and second grooves, thereby retaining the tire on the pin.

6. A clutch as claimed in claim 1, wherein the retainer retains the tire on the dowel pin via the bushing.

7. A clutch as claimed in claim 1, wherein the release bearing and roller are configured as a set to provide a predetermined relationship between an angle of rotation of the clutch release shaft and an axial position of the clutch release sleeve.

8. A clutch as claimed in claim 5 wherein:

a first of the bushings is disposed distal to the fork arm;

the first of the bushings has an innermost edge proximate to the retainer;

a first side of the tire is disposed proximate to the fork arm; and the innermost edge of the first bushing is spaced from the retainer when the first side of the tire is in engagement with the fork arm.

9. A clutch release mechanism comprising:

a clutch release sleeve having a lever engagement feature at a first end;

a clutch release bearing engaging a second end of the sleeve and having an inner race rotatably fixed to the second end of the clutch release sleeve; and a clutch release fork having rollers disposed on each of two arms for engagement with the clutch release bearing, the rollers each including a dowel pin with a first end received by a respective fork arm, the dowel pin having a second end encircled by a rotatively mounted tire, the tire having a through bore and a bushing fixedly mounted therein, and a retainer disposed between the tire and the pin for preventing axial displacement of the tire from the second end of the dowel pin.

10. A heavy clutch release mechanism as claimed in claim 9, wherein the rollers are mounted on an inboard side of the arms.

11. A clutch release mechanism as claimed in claim 9, wherein the release bearing and roller are configured as a set to provide a predetermined relationship between an angle of rotation of the clutch release shaft and an axial position of the clutch release sleeve.

12. A clutch release mechanism as described in claim 9, wherein the tire has a crown.

13. A clutch release mechanism as claimed in claim 9, wherein the bushing has an interference fit with the tire.

14. A clutch release mechanism as claimed in claim 13, wherein the bushing is press fit within the tire.

15. A clutch release mechanism as described in claim 9, wherein the tire has a first annular groove and the dowel pin has a second annular groove aligned with the first annular groove and a retaining ring is disposed in the aligned first and second grooves to axially restrain the tire on the dowel pin.

16. A clutch release mechanism as claimed in claim 9, wherein there are two bushings fixed within the tire defining a first annular groove and the dowel pin has a second annular groove aligned with the first annular groove and the retainer is disposed in the aligned first and second grooves.

17. A clutch release mechanism as claimed in claim 9, wherein the retainer retains the tire on the dowel pin via the bushing.

18. A clutch release mechanism as claimed in claim 16 wherein a first of the bushings is disposed distal to the fork arm;

the first of the bushings has an innermost edge proximate to the retainer;

a first side of the tire is disposed proximate to the fork arm; and the innermost edge of the first bushing is spaced from the retainer when the first side of the tire is in engagement with the fork arm.

19. A clutch release fork for engagement with a clutch release bearing comprising:

a cross member;

two opposed arms connected to each other by the cross member;

a roller disposed on each arm for engagement with a clutch bearing, the roller including:

a dowel pin having first and second ends, the first end being received in a respective fork arm;

a tire with a through bore encircling the second end of the dowel pin, the tire being rotatively mounted on the dowel pin second end;

a bushing fixedly mounted in the through bore of the tire; and a retainer configured to prevent axial displacement of the tire from the dowel pin.

20. A clutch release fork for engagement with a clutch release bearing as claimed in claim 19, wherein the dowel pin second end has a first annular groove, and the tire has two bushings defining a second annular groove aligned with the first annular groove, and the retainer is a retainer ring on the dowel pin.

21. A clutch release fork for engagement with a clutch release bearing as claimed in claim 20, wherein;

a first of the bushings is disposed distal to the fork arm;

the first of the bushings has an innermost edge proximate to the retainer;

a first side of the tire is disposed proximate to the fork arm; and the innermost edge of the first bushing is spaced from the retainer when the first side of the tire is in engagement with the fork arm.

\* \* \* \* \*